July 30, 1940.  C. M. LIVINGSTON  2,209,736
V-BELT CLUTCH PULLEY
Filed Sept. 26, 1939
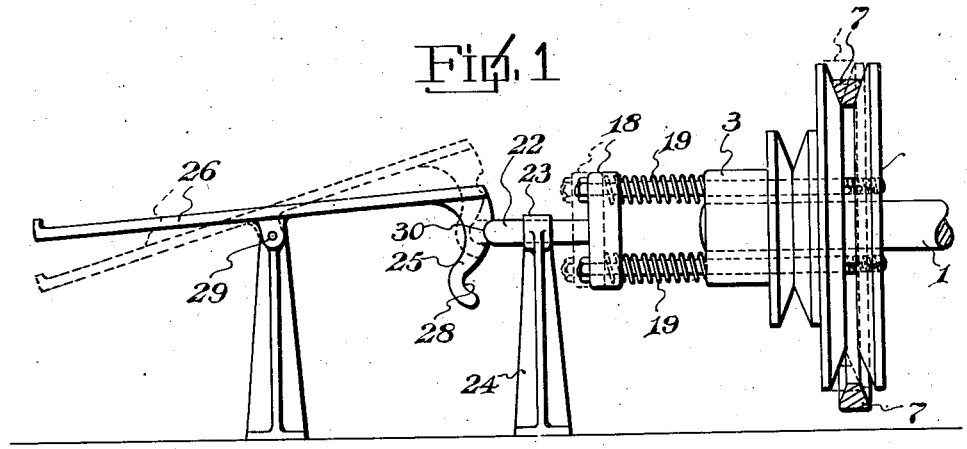
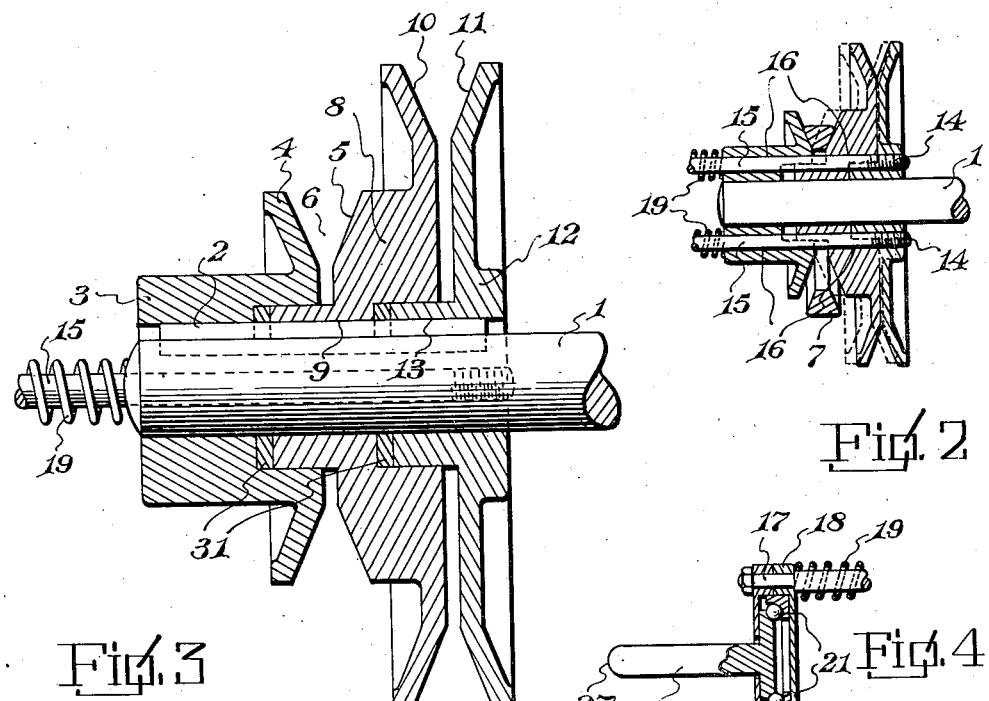
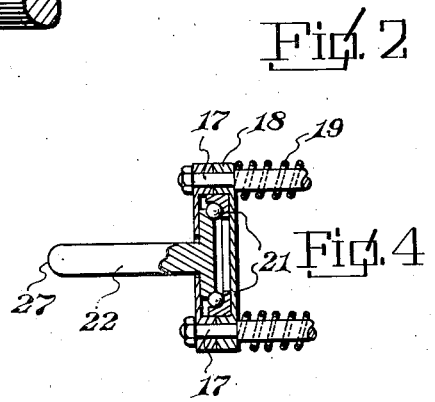
Charlie M. Livingston
INVENTOR
BY
ATTORNEY Patented July 30, 1940

2,209,736

UNITED STATES PATENT OFFICE 2,209,736

V-BELT CLUTCH PULLEY

Charlie M. Livingston, Tulsa, Okla.

Application September 26, 1939, Serial No. 296,665

3 Claims. (Cl. 74—230.24)

The invention relates to clutch pulleys for V-type belts, and has for its object to provide a pulley formed from flanged sections for the reception of a belt and means whereby said sections can be spread apart for releasing its frictional gripping action on the belt when it is desired to stop the operation of a driven member, for instance another pulley, without stopping the rotation of the drive pulley.

A further object is to provide a clutch pulley comprising a member rigidly carried by a driven shaft and in cooperation with a member slidably feathered on the shaft forming a belt groove and expansible spring means normally forcing the pulley sections together for gripping a belt during a driving operation. A further object is to provide operator controlled means cooperating with the spring means which normally force the sections together for spreading the pulley sections and allowing the belt to be released incident to slack developed in the belt.

A further object is to provide rods anchored to the feathered pulley section and extending through apertures in the stationary pulley section and having expansion springs interposed between the stationary section and a cross head and normally forcing the pulley sections together for gripping a driven belt.

A further object is to provide a thrust rod pivotally connected to the thrust bearing cross head and means cooperating with the ends of the thrust rod for compressing the springs for a belt declutching operation or allowing the springs to expand for a belt clutching operation.

A further object is to provide a clutch pulley comprising an outer stationary pulley section, an inner axially movable pulley section and a double faced intermediate section axially movable for forming a double pulley and spring means for normally forcing all of the pulley sections towards the stationary section for a belt clutching operation. Also to provide means cooperating with the spring means whereby any of the pulley grooves may be spread for a belt declutching operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the pulley showing the clutch control mechanism.

Figure 2 is a horizontal sectional view through the pulley.

Figure 3 is a horizontal sectional view through the pulley, showing spacer washers interposed between the sections for adjusting the pulley grooves to receive different size belts.

Figure 4 is a longitudinal sectional view through the thrust bearing.

Referring to the drawing, the numeral 1 designates a driven shaft. However it is to be understood the pulley may be applied to a drive shaft if desired. Rigidly keyed at 2 on the driven shaft 1 is the hub 3 of the outer pulley flange 4, and which flange, in combination with the bevelled surface 5, forms the small pulley groove 6 for the reception of a V-shaped belt 7. The bevelled surface 5 is carried by an intermediate pulley section 8, which is slidably keyed at 9 on the shaft 1, and is provided with a groove flange 10 which cooperates with the groove flange 11 of the pulley section 12, which pulley section 12 is also slidably keyed at 13 to the shaft 1. It will be noted that a double pulley is provided. However the outer section is rigidly held on the shaft to rotate therewith and against axial movement. The intermediate section 8 and the section 12 can axially move on the shaft. However all of the sections rotate together. Threaded at 14 into the section 12 at opposite sides of the shaft 1 are stud bolts 15, which extend through alined apertures 16 in the intermediate section 8, and the hub 3. The stud bolts 15 extend outwardly and terminate in reduced portions 17 anchored in opposite ends of a separable thrust bearing 18, clearly shown in Figure 4. Interposed between the thrust bearing 18 and the hub 3 are expansion springs 19 which normally force the various pulley sections towards each other for a belt driving operation. It has been found, when slack has been allowed to develop in a belt, the pulley will revolve without driving the belt, and to accomplish this result it will be seen, referring to Figure 1, that when the pulley section 12 is moved to its full line position, slack will develop in the belt and the pulley or belt will not be driven. This action takes place according to which pulley groove the belt is in. Figure 2 shows the belt in the small pulley groove and the dotted lines in this view show the clutched position of the parts.

The thrust bearing 18 has connected thereto by means of anti frictional bearings 21 a thrust rod 22. The thrust rod 22 is slidably mounted in a bearing 23 of a support 24 and terminates adjacent a notched arm 25 of a rock lever 26. This rock lever may be in the form of a foot pedal as shown, however applicant does not limit himself in this respect. The outer end of the thrust rod 22 is rounded as shown at 27, and when the arm 26 is rocked to the full line position shown in Figure 1, the expansion springs 19 are compressed and the pulley section will spread according to which pulley groove the belt is disposed in. When the lever 26 is rocked to the dotted line position shown in Figure 1, the expansion springs will force the pulley sections together for a belt clutching operation, and at which time the end 27 of the thrust rod 22 is in the recess 28 of the arm 25 which is closer to the pivotal point 29 of the lever 26 than the recess 30 in the arm 25.

The pulley can be adjusted for various size belts by inserting spacer members 31 between the same. This structure is set forth in my copending application. Serial No. 296,666, filed September 26, 1939.

From the above it will be seen that a clutch pulley is provided for V-type belts, which is simple in construction and one which may be easily and quickly operated for clutching and declutching the belt.

The invention having been set forth what is claimed as new and useful is:

1. A clutch pulley comprising a driven shaft a pulley section rigidly mounted on said shaft, a second pulley section slidably keyed on said shaft, stud bolts carried by the slidable section and extending through the first mentioned section, a thrust bearing carried by said stud bolts, expansion springs interposed between the thrust bearing and the first mentioned section and normally forcing the pulley sections together and means cooperating with the thrust bearing for controlling the slidable pulley section for a belt clutching or declutching operation.

2. A device as set forth in claim 1 including a thrust rod carried by the thrust bearing and pivotally connected thereto on the axis of the driven shaft and a rockable notched member cooperating with the outer end of the thrust rod for controlling the axial movement of the axially movable pulley section.

3. A double clutch pulley comprising a rotatable shaft, an outer pulley section keyed on said shaft, an inner pulley section axially movable on the shaft, an intermediate pulley section cooperating with the first mentioned pulley sections for forming a double grooved pulley, stud bolts anchored to the inner pulley section and extending through the other pulley sections, a thrust bearing connecting said stud bolts, expansion springs surrounding the stud bolts between the thrust bearing and the outer pulley section and normally forcing the inner and intermediate sections outwardly and means cooperating with the thrust bearing for controlling the expansive action of the springs for a belt clutching or declutching operation.

CHARLIE M. LIVINGSTON.